No. 637,023. Patented Nov. 14, 1899.
A. PEGLOW.
HEATING SYSTEM.
(Application filed Aug. 23, 1899.)

(No Model.)

Witnesses.
O. H. Keeney.
Anna V. Faust.

Inventor.
Albert Peglow.
By Benedict and Morsell
Attorneys.

THE NORRIS PETERS CO., PHOTO-LITHO., WASHINGTON, D. C.

UNITED STATES PATENT OFFICE.

ALBERT PEGLOW, OF MENOMONEE FALLS, WISCONSIN.

HEATING SYSTEM.

SPECIFICATION forming part of Letters Patent No. 637,023, dated November 14, 1899.

Application filed August 23, 1899. Serial No. 728,206. (No model.)

*To all whom it may concern:*

Be it known that I, ALBERT PEGLOW, of Menomonee Falls, in the county of Waukesha and State of Wisconsin, have invented a new and useful Improvement in Heating Systems, of which the following is a description, reference being had to the accompanying drawings, which are a part of this specification.

My invention has relation to improvements in heating systems adapted more especially for supplying the heating medium in a hot-water or steam heating system for buildings or dwellings.

The primary object of the invention is to obtain a maximum amount of heat from a minimum amount of fuel, the device for this purpose being simple in construction and inexpensive of production.

Figure 1:
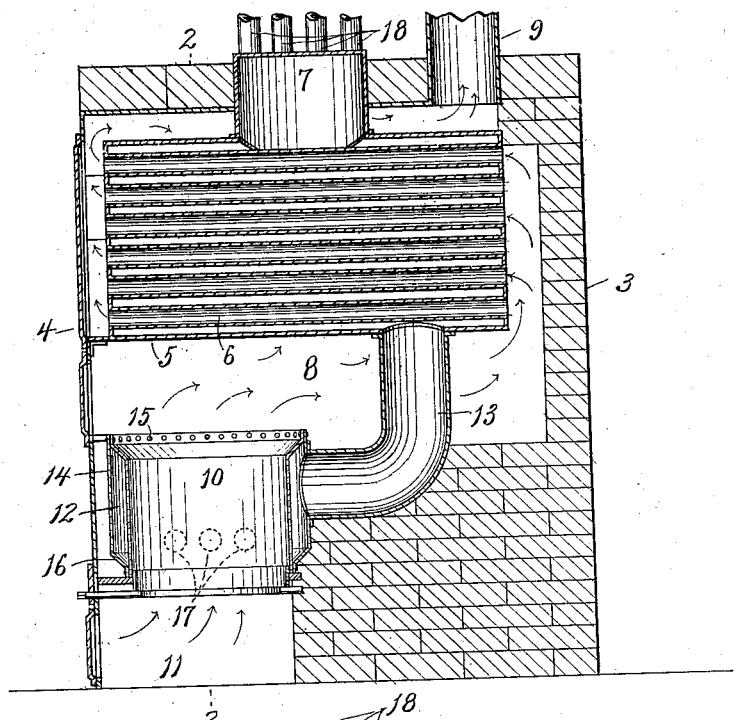
Figure 2:
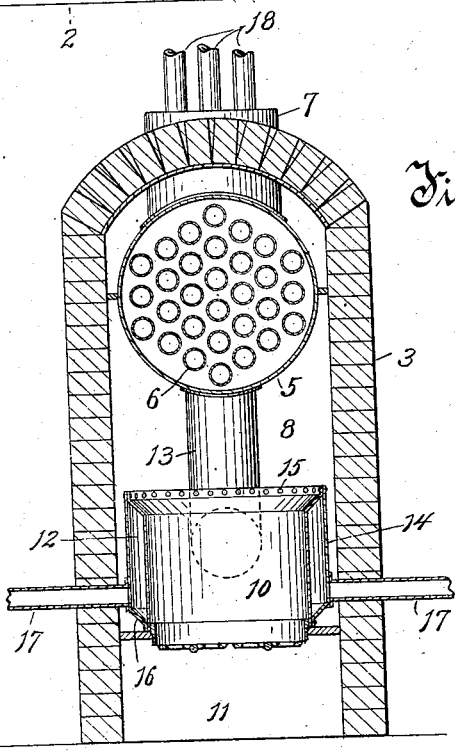

In the accompanying drawings, Figure 1 is a vertical longitudinal section through the furnace, and Fig. 2 is a transverse section of Fig. 1 on a plane through the center of the fire-box.

Referring to the drawings, the numeral 3 indicates the usual incasing brickwork or masonry which is built around the furnace. The metallic front of the furnace is indicated by the numeral 4, which front is provided with the usual door leading to the boiler-space and with the usual doors leading to the ash-pit and to the fire-box.

Within the incasing masonry is arranged a boiler 5 of the usual and ordinary form of construction, said boiler having extending longitudinally therein the fire-flues 6. From the top of the boiler and projecting through the top of the masonry extends the dome 7. The boiler is located within the hot-air chamber 8 of the furnace, and from this chamber extends the smoke-stack 9.

The numeral 10 indicates a fire-box, which is supported a desirable distance about the bottom of the furnace, the space below said fire-box forming the ash-pit 11. Surrounding the fire-box is an annular water-chamber 12, and from this chamber extends a pipe 13, the upper end of said pipe connecting with the bottom of the boiler, so as to communicate with the interior of said boiler. The fire-box is preferably formed with an outwardly-flaring top, and the annular water-chamber 12 is formed by a circular metallic ring 14, surrounding the fire-box, with its top edge secured to the outermost portion of the flaring top of the fire-box, preferably by means of rivets 15. The lower end of the ring or wall 14 is inwardly inclined, as indicated by the numeral 16, so as to join the fire-box and provide for its connection to said fire-box.

Leading to the annular chamber 12 are series of pipes 17, one series communicating with one side of the chamber 12 and the other series with the diametrically opposite side of said chamber. These pipes 17 at some desirable point, usually in the upper part of the building or dwelling, are provided with means for supplying water thereto. Extending from the dome 7 is another series of pipes 18, said pipes extending to radiators or equivalent heat-producing devices in the different rooms of the building and finally leading to and connecting with the series of pipes 17, so as to form a number of endless pipes.

In the use of my invention in connection with a hot-water-heating system the hot air and products of combustion from the fire-box 10 are free to pass into the hot-air chamber 8, thence around the pipe 13 and around the exterior of the boiler and through the fire-flues 6, thence around the dome 7, and finally out of the smoke-stack 9, as indicated by the arrows in Fig. 1. The draft of course is through the boiler-front into the ash-pit, and thence upwardly through the fire-box. The water which is introduced in the system of pipes passes through the pipes 17 into the annular chamber 12, where of course it is heated directly by the fire in the fire-box. The hot water then rises through the pipe 13 and is again subjected to the hot air and products of combustion which flow around said pipe, and the water then passes into the boiler and fills the space around the fire-flues 6, where it is again heated by the hot air passing through the flues, and said water finally passes into the dome and through the pipes 18 and is conducted by said pipes to the different radiators or heating devices located throughout the building and is finally conducted back through the pipes 17 to the water-chamber 12. It will be observed that the water is also finally heated just after passing into the dome by reason of the hot air which flows around said dome on its passage to the smoke-stack.

By my invention it is obvious that a minimum amount of fuel will produce a most intense heat and that the water in its passage to the pipes 18 is continually and successively subjected to the heat of the hot air and products of combustion and that the heat is retained in the boiler the maximum length of time before its final exit therefrom, whereby the full heating capacity is utilized.

In the use of my invention as a steam-heating system substantially the same operation takes place, excepting that the level of the water is always maintained on a level with or below the top of the boiler, so that a steam-space is formed between said level of the water and the top of the dome, and the steam generated therein is free to pass through the system of pipes 18 and is finally conducted back to the chamber 12 through the pipes 17, the steam before its final return to the chamber 12 having been condensed, and therefore reconverted into water and finally returned to the chamber 12 in its fluid condition.

What I claim is—

In a heating system, the combination, of an outer casing having an interior hot-air chamber, a boiler arranged entirely within the chamber, and so disposed as to have spaces at opposite ends and around the circumference thereof, a series of longitudinal flues extending from end to end of the boiler, a dome leading from the upper side of the boiler and through the top of the casing, a smoke-stack or exit-flue leading from the terminal end of the space above the boiler, a fire-box located below the boiler, a water-jacket surrounding the fire-box and forming a water-chamber, a pipe extending from the water-chamber, thence upwardly through the space of the hot-air chamber below the boiler, and communicating with the bottom of the boiler, and an endless system of pipes connecting the dome and the water-chamber, and adapted for heating radiators, or other heating devices arranged within their length.

In testimony whereof I affix my signature in presence of two witnesses.

ALBERT PEGLOW.

Witnesses:
C. RIEGEN,
CHS. JAUNKE.